Sept. 24, 1946.    C. O. ROTHWEILER    2,408,343

LEVEL

Filed June 10, 1944

INVENTOR.
CHARLES O. ROTHWEILER
BY Christian R. Nielsen
ATTORNEY.

Patented Sept. 24, 1946

2,408,343

UNITED STATES PATENT OFFICE 2,408,343

LEVEL

Charles O. Rothweiler, Milwaukee, Wis.

Application June 10, 1944, Serial No. 539,750

3 Claims. (Cl. 248—180)

My invention relates to levels and more particularly to a type of level mounting used on surveyors' tripods, theodolites, and analogous instruments.

The object of my invention is to provide a means or mounting that will facilitate lateral adjustment of the level in all directions.

Another object of my invention is to so construct the mounting as to enable rigid adjustment yet free movement in a horizontal plane.

Still another object of my invention is to provide a mounting means that permits independent support of the level and the tripods.

Figure 1:
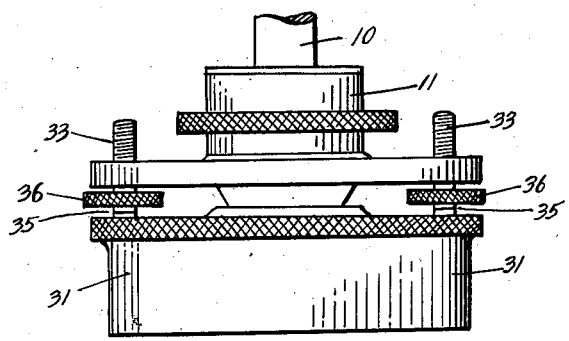
Figure 2:
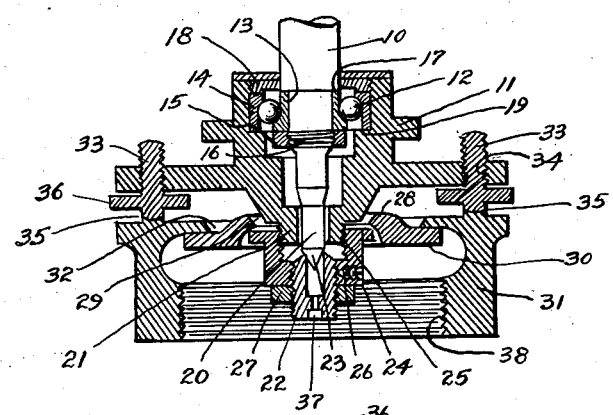
Figure 3:
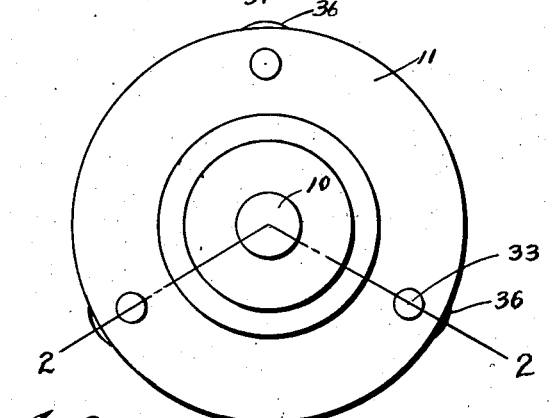

Other and further objects of my invention will become more apparent as the description proceeds when taken in conjunction with the drawing in which Figure 1 is a side view of the assembled device, Figure 2 is a cross-sectional view of the device taken at the line 2—2 in Figure 3, illustrating the various parts constituting the unit and showing their relation to one another, and Figure 3 is a top view of the device shown in Figures 1 and 2 respectively.

Similar characters of reference indicate corresponding parts throughout the several views and referring now to the same the character 10 illustrates a shaft vertically disposed and arranged as a support or mounting for a level. There is an outer casing 11 acting as a housing and support for an end thrust bearing having a plurality of balls 12 encased in an inner race 13 and an outer race 14. The inner race 13 is rigidly attached to the shaft 10 by means of a lock nut 15 screwed onto the external threaded portion 16 on the shaft 10. The outer race 14 is rigidly mounted in the housing 11 by means of the lock nut 18 and against a shoulder portion 19 of the housing 11.

A vertical section 20 of the shaft 10 is in direct alignment with a cylindrical portion 21 of the housing 11.

There is a conical ground seat bearing nut 22 engaging the conical lower end 23 of the shaft 10. This nut 22 is threaded externally and engages an auxiliary member 24 having an internal thread and engaging a lower portion of the housing 11 at 25. The nut 22 is rigidly mounted into the auxiliary member 24 and kept from turning by the set screw 26 and the lock nut 27 as shown.

A thrust plate 28 encircling the housing 11 at 29 has a horizontal projecting ledge 30 disposed for engagement with the threaded collar 31. The aperture 32 in the upper portion of the collar 31 is larger than the body of the thrust plate 28 permitting free movement laterally, and the relation of the collar 31 to the housing 11 is governed by leveling screws 33 engaging the housing 11 by means of threads at 34 and the radial contact surfaces 35 on the collar 31. For convenience in operation the leveling screws 31 are shown with a knurled flange 36. There is an aperture 37 provided in the bearing nut 22 to permit the insertion of a cord for plumb-bob for its suspension between the tripods not shown.

In operation the level is attached to the shaft 10 which in turn is suspended in the housing 11 by means of the inner race 13 and the outer race 14 of the ball bearings 12 at the upper end, and the conical seat 23 in the bearing nut 22 at the lower end.

The threaded collar 31 is fastened to the tripod support by means of the thread 38 and against the thrust plate 28 which in turn contacts the auxiliary member 24.

The lateral relation between the collar 31 and the housing 11 being governed by the leveling screws 33.

It is manifest to anyone familiar with the art that this arrangement permits free movement of the shaft 10 in a definite fixed vertical plane.

In the chosen embodiments of my invention exemplified by the accompanying drawing there are present features not heretofore disclosed in the prior art. I do not wish to be limited however to the exact construction as shown and the right is herein reserved to make such changes as are found desirable without departing from the appended claims.

Having thus described my invention, what I claim and desire to secure by Letters Patent in the United States is:

1. A device of the character described comprising a vertical shaft, an outer casing, an end thrust bearing disposed between said shaft and casing, a lock nut for supporting the inner race of said bearing to the shaft, a lock nut supporting the outer race of said bearing to the casing, a ground seat bearing nut, an auxiliary member attaching said bearing nut to said casing, the lower end of said shaft ground for engagement with said bearing nut, a flanged thrust plate, a threaded collar horizontally disposed encircling said thrust plate, said collar having an aperture in its center, a plurality of leveling screws threadedly supported by said casing, radial contact surfaces on said collar, said surfaces corresponding with said leveling screws and arranged for engagement therewith, thereby causing an adjustable contact between said casing and said collar when said collar is attached to a tripod or the like.

2. A device as described in claim 1 provided with an aperture in the bearing nut to permit attachment of a plumb-bob.

3. A device of the character described comprising in combination a vertical shaft arranged for supporting a level at its upper end and having a conical ground point at its lower end, an outer casing, an end thrust bearing disposed between said shaft and casing, a lock nut engaging said shaft for the support of the inner race of said bearing, a lock nut engaging said casing disposed for the support of the outer race of said bearing, a bearing nut, said bearing nut provided with a conical ground seat for engagement with the lower end of said shaft, an auxiliary nut supporting said bearing nut to said casing, means for retaining said bearing nut in a fixed position within said auxiliary nut, a thrust plate, said plate provided with an outwardly extending flange at its circumference, a threaded collar, said collar provided with an aperture larger than the main body of said thrust plate and arranged for engagement above the outer flange of said thrust plate, a plurality of leveling screws threadedly supported by said casing, radial contact surfaces on said collar, said surfaces corresponding with the leveling screws and disposed for engagement therewith, thereby causing an adjustable contact between said casing and said collar when the collar is attached to a tripod or the like.

CHARLES O. ROTHWEILER.